US011884035B2

(12) United States Patent
Guy et al.

(10) Patent No.: US 11,884,035 B2
(45) Date of Patent: Jan. 30, 2024

(54) DRUM AND METHOD FOR MANUFACTURING A TIRE BLANK

(71) Applicant: COMPAGNIE GENERALE DES ETABLISSEMENTS MICHELIN, Clermont-Ferrand (FR)

(72) Inventors: Thomas Guy, Clermont-Ferrand (FR); Michel Deboeuf, Clermont-Ferrand (FR); Gael Roty, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 371 days.

(21) Appl. No.: 17/414,644

(22) PCT Filed: Dec. 18, 2019

(86) PCT No.: PCT/FR2019/053144
§ 371 (c)(1),
(2) Date: Jun. 16, 2021

(87) PCT Pub. No.: WO2020/128320
PCT Pub. Date: Jun. 25, 2020

(65) Prior Publication Data
US 2022/0048265 A1 Feb. 17, 2022

(30) Foreign Application Priority Data

Dec. 20, 2018 (FR) ...................................... 1873555
Jan. 31, 2019 (FR) ...................................... 1900895

(51) Int. Cl.
*B29D 30/24* (2006.01)
*B29D 30/32* (2006.01)

(52) U.S. Cl.
CPC ........... *B29D 30/247* (2013.01); *B29D 30/32* (2013.01); *B29D 2030/3214* (2013.01)

(58) Field of Classification Search
CPC ................. B29D 30/247; B29D 30/32; B29D 2030/3214
See application file for complete search history.

(56) References Cited

U.S. PATENT DOCUMENTS 3,745,085 A 7/1973 Bertrand et al.
5,405,484 A 4/1995 Wollbrinck et al.
(Continued)

FOREIGN PATENT DOCUMENTS

EP 1162056 A2 12/2001
EP 1623819 A1 2/2006

OTHER PUBLICATIONS

International Search Report dated Mar. 20, 2020, in corresponding PCT/FR2019/053144 (4 pages).

*Primary Examiner* — Joseph S Del Sole
*Assistant Examiner* — Mohamed K Ahmed Ali
(74) *Attorney, Agent, or Firm* — VENABLE LLP

(57) ABSTRACT

Drum (10) for manufacturing a tire blank, comprising a shaft, two flanges (14) movable in translation along the shaft, and means for supplying compressed air, each flange comprising at least one pneumatic effector (36). At least one flange comprises a first, radially internal ring (46) and a second, radially external ring (48) movable in rotation around the first ring by means of at least two airtight pivot connections (50), the rings and the pivot connections delimiting at least one sealed chamber (52), said flange comprising at least one first compressed-air circulation channel (54), a first section (56) of the first channel belonging to the first ring being connected at one of its ends to the sealed chamber, and a second section (58) of the first channel (Continued)

belonging to the second ring being connected at one of its ends to the sealed chamber.

10 Claims, 2 Drawing Sheets

(56) References Cited

U.S. PATENT DOCUMENTS

2002/0011312 A1    1/2002   Tokunaga
2006/0027310 A1    2/2006   Auclair

DRUM AND METHOD FOR MANUFACTURING A TIRE BLANK

BACKGROUND

The invention relates to the manufacture of tyres comprising a carcass reinforcement, the reinforcing elements of which are radial in the sidewalls and have an oblique angle with respect to the circumferential direction in the crown or the beads of the tyre.

More particularly, the invention relates to a drum for manufacturing a tyre blank and to a method implementing such a drum.

A tyre is divided into three distinct zones comprising a crown which comprises in particular a crown reinforcement and a tread intended to come into contact with the ground, beads intended to ensure the attachment of the tyre to the rim of a wheel, and sidewalls intended to connect the crown to the beads.

In order to connect the crown to the beads, a tyre generally comprises a reinforced reinforcement, forming a carcass, the reinforcing elements of which are composed of sections of metal wires embedded in a vulcanized elastomeric matrix. The sections of wires generally have an angle of 90° with the circumferential direction of the tyre. Such a reinforcement is called a "radial carcass reinforcement".

However, the radial carcass reinforcement contributes superfluously to the expected performance of the tyre in the crown zone. It is then possible to replace an element of the ring reinforcement by a carcass reinforcement provided that the wire sections of the carcass reinforcement have, in the crown zone of the tyre, an angle generally between 10° and 40° with the circumferential direction of the tyre, equivalent to that of the element of the replaced crown reinforcement.

In order to manufacture such a tyre, elements taking the form of bead wires, bands or plies are successively and circumferentially placed on a drum for manufacturing a tyre blank of cylindrical shape. The element of a tyre blank which forms the carcass reinforcement of the tyre is called the carcass ply. The wire sections of the carcass ply have a given angle with the longitudinal direction of the ply laid flat, allowing the desired angle to be subsequently obtained in the carcass reinforcement in the crown zone of the tyre.

Next, the cylindrical-shaped tyre blank is transformed into a toroidal-shaped tyre blank, during a step called shaping. During this transformation, the crown of the blank is stretched so as to increase its diameter, by pressurizing the volume delimited by the blank and the drum with air, and the beads of the blank are axially brought closer together.

Furthermore, in order for the reinforcing elements of the blank to become radial in the sidewalls or, in other words, for the reinforcing elements to become radial, one bead of the blank must be movable in rotation with respect to the other bead.

Patent application EP1623819 in the name of the applicants attempts to provide a solution to this problem by proposing a drum for manufacturing tyre blanks, comprising a shaft extending axially and two flanges mounted to move in translation along the shaft, and in rotation around the shaft. Each flange comprises in particular actuators capable of holding a bead of the blank. At least one of the flanges is movable in rotation around the shaft under the action of a motorized drive system housed in said flange, so as to allow the radialization of the reinforcing elements.

However, the integration of a motorized system in order to drive a flange in rotation is an expensive and bulky solution.

In addition, a flange includes actuators to be supplied with compressed air. The compressed air is brought from a compressed-air supply, belonging to a fixed assembly, to the actuators, belonging to each flange movable in rotation, by hoses. Hoses have the drawback of limiting the angular deflection of the flange in rotation around the shaft.

Finally, the limitation of the angular deflection of the flange makes it necessary to reposition it angularly at each cycle of manufacturing a blank, which is restrictive.

An objective of the invention is to remedy the aforementioned drawbacks and to provide an original, inexpensive and compact solution in order to allow the supply of compressed air to the actuators mounted on a flange movable in rotation, without limiting the angular deflection of said flange and without being constrained to angularly reposition said flange at each cycle.

SUMMARY

This objective is achieved by the invention, which proposes a drum for manufacturing a tyre blank, comprising a shaft extending axially, two flanges movable in axial translation along the shaft, and means for supplying compressed air, each flange comprising at least one pneumatic effector cooperating with the tyre blank, the drum being characterized in that at least one flange comprises a first, radially internal ring, movable in axial translation along the shaft, and a second, radially external ring comprising the radially external pneumatic effector(s) movable in rotation around the first ring by means of at least two airtight pivot connections, the rings and the pivot connections delimiting at least one sealed chamber, and in that said flange comprises at least one first compressed-air circulation channel, a first section of the first channel belonging to the first ring being connected at one of its ends to the compressed-air supply means and at the other of its ends to the sealed chamber, and a second section of the first channel belonging to the second ring being connected at one of its ends to the sealed chamber and at the other of its ends to the pneumatic effector.

The airtightness of the pivot connections allows the creation of a toric-shaped sealed chamber, used as a compressed-air circulation channel. Thus, a section of channel belonging to the first ring and opening into the sealed chamber communicates with another section of channel belonging to the second ring and also opening into the sealed chamber, thus making it possible to overcome the limitation of the angular deflection and the angular repositioning constraint of the flange of the prior art.

During the manufacture of a tyre blank and, more precisely, during the shaping of the blank, the volume delimited by the blank and the drum is put under air pressure. The blank thus exerts a significant axial force on the flanges up to 40 kN, for an air pressure of 0.5 bar in said volume, to be transmitted from the second to the first ring. The two pivot connections allow good transmission of the axial force.

Preferably, the two pivot connections each comprise an angular contact ball bearing, mounted so as to form a so-called "O" assembly. Ball bearings constitute an economical and compact solution compared with the drive means housed in the flanges of the prior art In addition, angular contact ball bearings have the advantage of excellent transmission of axial forces.

Preferably, the pivot connections each comprise a one-part airtight seal, taking the form of a ring fitted between the first and the second ring. Such a seal makes it possible to guarantee good sealing of the sealed chamber while minimizing the friction between the two rings.

Advantageously, the drum comprises drive means for the axial translation of the flanges, said drive means comprising transmission fingers, each transmission finger being fixed to a flange and movable in axial translation along a groove of the shaft. The transmission fingers constitute a simple and compact solution for the transmission of axial forces between the inside and the outside of the shaft.

Advantageously, at least one of the transmission fingers is fixed to the first ring and comprises a third section of the first channel connected at one of its ends to the compressed-air supply means and at the other of its ends to the first section of the first channel.

Drums comprising a flange driven in axial translation on the shaft by means of a transmission finger have the advantage of providing a simple means of supplying compressed air to a pneumatic device via said finger. The construction of a drum is thus simplified. In addition, feeding a device outside the shaft from inside the shaft has the advantage of avoiding interference between pneumatic hoses and movable assemblies.

Preferably, the compressed-air supply means comprise a main supply connected to the first channel by means of a pneumatic hose. The pneumatic hose is spirally wound inside the shaft so as to deform in an orderly fashion during axial movements of the transmission fingers, in the manner of a tension spring.

Advantageously, the drive means comprise a rod and two nuts, said rod extending axially, being movable in axial rotation, and comprising two threaded sections of opposite pitches, each nut being movable to slide substantially symmetrically with respect to the other nut along one of the two sections, each transmission finger being fixed to a nut. A screw-nut system is a compact and precise drive means for the axial and symmetrical translation of the flanges.

Advantageously, the pneumatic effector(s) of a flange comprise a holding device capable of holding a bead of the tyre blank and of forming an airtight contact with said bead. Thus, the volume delimited by the tyre blank and the drum is sealed against compressed air up to 0.5 bar, and it is no longer necessary to resort to the inflation of a flexible membrane to put it under pressure, which simplifies the construction of the drum and broadens its ability to manufacture blanks of different dimensions.

Advantageously, the flange(s) comprise braking means for rotationally blocking the second ring.

When shaping the blank, stretching the crown of the blank causes tensions in the reinforcing elements of the sidewall. These tensions tend to radialize the reinforcing elements and to cause the beads to rotate around the flange(s). The rotation of the beads being blocked by the holding device(s), the second ring, free to rotate around the first ring, pivots and allows radialization. However, in the absence of a motorized drive system capable of rotating or rotationally blocking the second ring, it is necessary to implement braking means.

Advantageously, the braking means comprise an inflatable seal arranged in the sealed chamber, said flange comprising a second compressed-air circulation channel, a first section of the second channel belonging to the first ring being connected at one of its ends to the compressed-air supply means, and at another of its ends to the inflatable seal.

The inflatable seal is actuated by air circulating through the second supply channel. The seal during inflation expands between the rings and blocks the rotation of the second ring by friction, like a brake. An inflatable seal is a simple and effective means of blocking the rotation of the second ring of a flange.

Preferably, the inflatable seal is of toric shape, and the outer surface of the seal is adhesive in order to promote the rotational blocking of the second ring.

Advantageously, the channels intended for the circulation of compressed air are embedded in the rings and the fingers. Thus, the rings and the transmission fingers have a small footprint and are easily integrated into the drum assembly.

Preferably, the rings and the transmission fingers are in one piece, and the channels are obtained by drilling. Such a construction gives good resistance to the rings and to the transmission fingers.

In addition, one subject of the invention is a method for holding a tyre blank using a tyre blank manufacturing drum according to the invention, comprising the following step:
holding the beads of the blank by supplying compressed air to the holding devices using the compressed-air supply means.

Finally, one subject of the invention is a method for manufacturing a tyre blank, comprising the following steps:
after having previously manufactured a cylindrical-shaped tyre blank, rotationally blocking the second ring(s) of the manufacturing drum, by actuating the braking means,
holding the tyre blank, according to a holding method according to the preceding claim,
stretching the crown of the blank so as to increase its diameter, by pressurizing the volume delimited by the blank and the drum with air, and bringing axially closer together the beads of the blank, using the manufacturing drum,
simultaneously with the axial bringing closer together of the beads of the tyre blank, freeing the rotation of the second ring(s) by not actuating the braking means.

BRIEF DESCRIPTION OF THE DRAWINGS

The invention will be understood better from the rest of the description, which is supported by the following figures.

DETAILED DESCRIPTION

In the various figures, elements that are identical or similar bear the same reference. Their description is therefore not systematically repeated.

Figure 1:
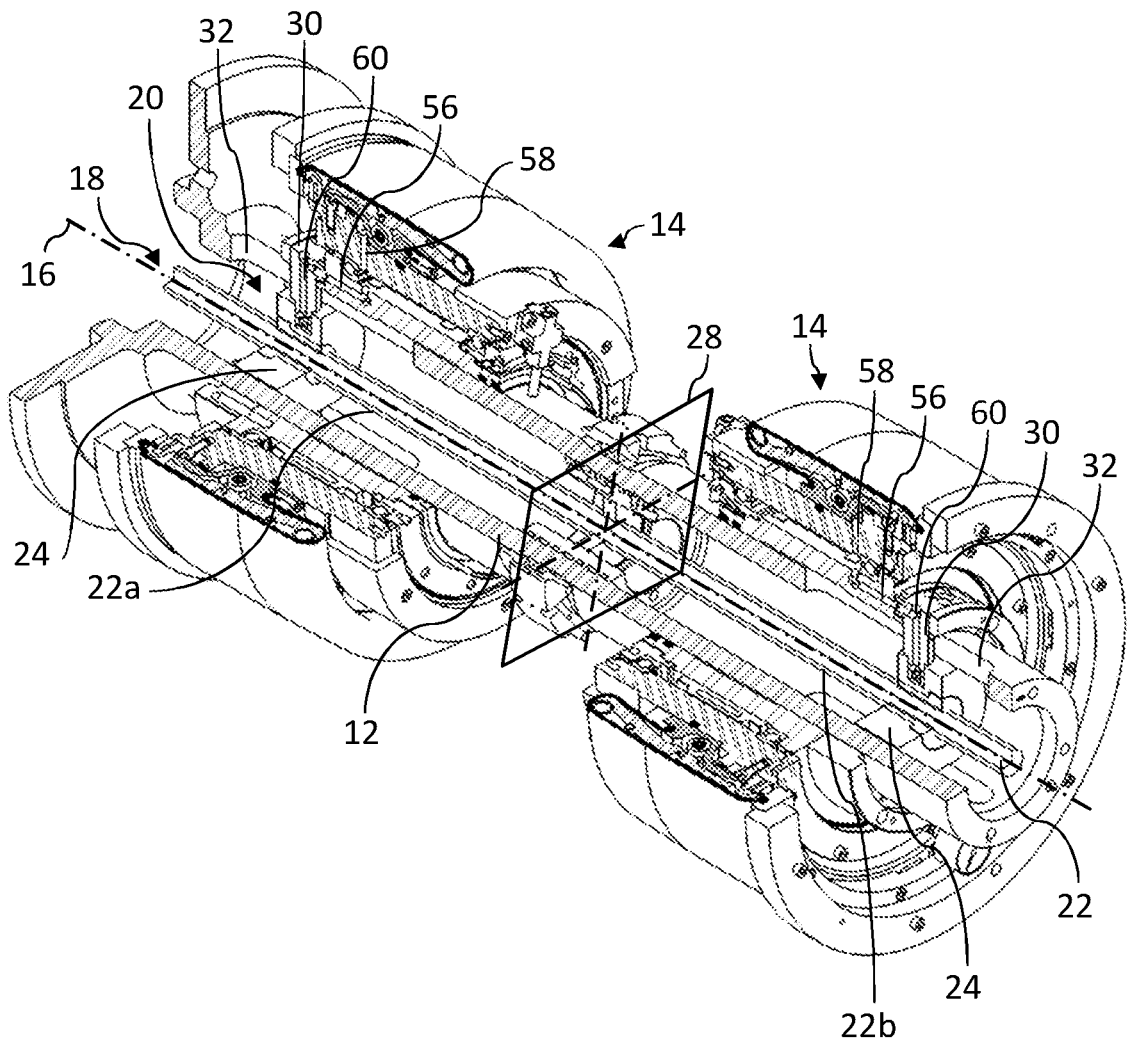
FIG. 1 is a perspective view in partial radial section of a tyre blank manufacturing drum according to the invention.

FIG. 1 illustrates a tyre blank manufacturing drum 10 comprising a frame in the form of a housing (not shown), a shaft 12 of cylindrical shape, and two flanges 14. The shaft extends axially from the housing, and is mounted to be movable in axial rotation with respect to the housing. The two flanges are mounted around the shaft, and are movable in axial translation along the shaft.

By "axial" or "axially", reference is made to a direction parallel to the axis 16 around which the shaft 12 is movable in rotation, or to a plane perpendicular to said axis.

By "radial" or "radially", reference is made to a direction or to a plane comprising the axis 16 of rotation of the shaft.

The drum further comprises drive means 18 for the axial translation of the flanges 14. The drive means comprise a motor arranged in the box and a screw-nut system 20 housed in the shaft 12 and the housing.

The screw-nut system 20 comprises a rod 22 and two nuts 24. The rod extends axially and, preferably, coaxially with the axis 16 around which the shaft 12 is movable in rotation.

The rod is mounted to be movable in axial rotation relative to the housing and driven in rotation by the motor. The rod has two threaded sections 22a, 22b with opposite pitches, each nut being movable to slide substantially symmetrically with respect to the other nut along one of the two sections. The term "substantially symmetrically" is understood to mean that the two nuts are located at the same distance from a median plane 26 of the drum and of the tyre blank with an accuracy of 0.5 mm.

Each nut 24 comprises at least one transmission finger 30 connected to a flange 14. Each transmission finger extends radially from the nut to a flange through the shaft 12, and is fixed to the nut and to the flange. Consequently, each finger is axially slideably movable. Each finger cooperates with a groove 32 of the shaft extending axially, such that when the rod 22 is rotated by the motor, the finger 30 is movable in axial translation along the groove 32. Consequently, the flange 14 is movable in axial translation along the shaft 12. Preferably, a flange comprises two transmission fingers connected to a flange in order to allow good transmission of the axial forces between the drive means 18 and the flanges.

Figure 2:
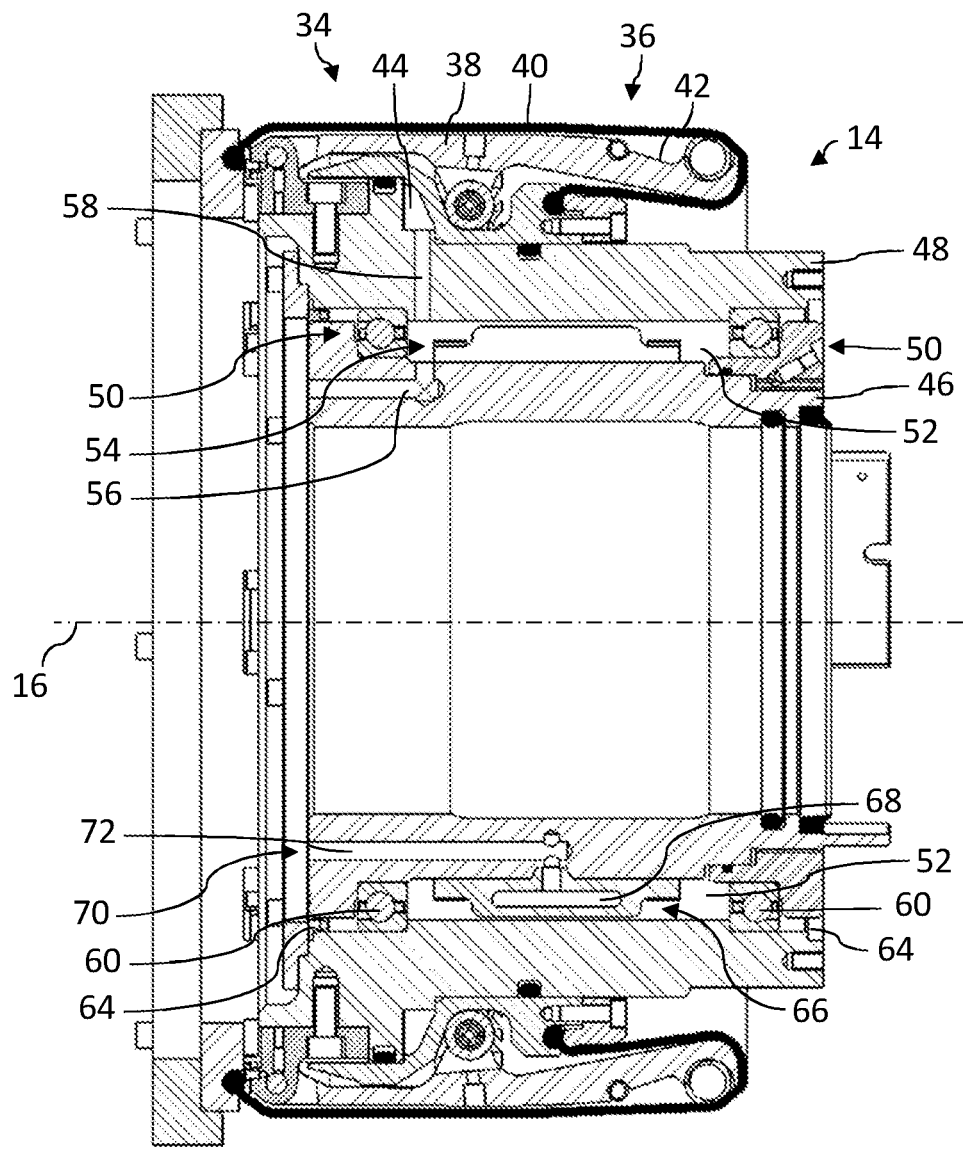
FIG. 2 is a radial sectional view of certain elements of FIG. 1.

FIG. 2 more particularly illustrates a flange 14. Each flange comprises at least one pneumatic effector 34 cooperating with the tyre blank. Furthermore, the drum comprises compressed-air supply means (not shown) intended to supply compressed air to the pneumatic effector(s) 34.

By way of example, a pneumatic effector comprises a device for turning the edges of the carcass ply around a bead wire comprising arms arranged circumferentially around the flange, and movable to pivot relative to the circumferential direction.

Preferably, the pneumatic effector(s) 34 comprise a holding device 36 capable of holding a bead of the tyre blank and of forming an airtight contact with said bead. Thus, the volume delimited by the tyre blank and the drum 10 is airtight. The holding device comprises levers 38 arranged circumferentially around the flange 14, movable to pivot relative to the circumferential direction, and a flexible membrane 40 forming a radially outer casing of the levers. Each lever comprises a groove 42 forming with the other levers a circumferential groove capable of accommodating the bead. The flexible membrane 40 allows the formation of an airtight contact with the bead. The groove 42 allows the positioning and axial position-holding of a bead.

Each lever 38 is movable between a first position for holding the bead, and a second position in which the bead is not held. A lever goes from the second to the first position by pivoting by the action of a piston 44. The pivoting of the levers causes the radial expansion of the flexible membrane 40. The piston is movable in radial translation by the action of the compressed air coming from the compressed-air supply means. The lever 38 passes from the first to the first second position by the action of the elastic radial withdrawal of the flexible membrane 40, and of a circumferential spring housed in the groove 42 of the levers 38.

According to the invention, at least one flange 14 comprises a first, radially internal ring 46, movable in axial translation along the shaft, and a second radially external ring 48 comprising the pneumatic effector(s) 34, movable in rotation around the first ring by means of at least two airtight pivot connections 50, the rings and pivot connections defining at least one sealed chamber 52. The airtightness of the pivot connections allows the creation of a toric-shaped sealed chamber, used as a compressed-air circulation channel. Preferably, the drum comprises two flanges according to the invention.

In addition, said flange comprises at least one first channel 54 for circulating compressed air. A compressed-air circulation channel comprises several sections. A first section 56 of the first channel belonging to the first ring is connected at one of its ends to the compressed-air supply means and at the other of its ends to the sealed chamber 52, and a second section 58 of the first channel belonging to the second ring being connected at one of its ends to the sealed chamber 52 and at the other of its ends to the pneumatic effector 34. Thus, a section of channel belonging to the first ring and opening into the sealed chamber communicates with another section of channel belonging to the second ring and also opening into the sealed chamber.

Preferably, at least one of the transmission fingers 30 is fixed to the first ring, and comprises a third section 60 (FIG. 1) of the first channel 54 connected, at one of its ends, to the compressed-air supply means and, at the other of its ends, to the first section 56 of the first channel. The transmission finger makes it possible to supply the holding device 36, outside the shaft, from the inside of the shaft.

Preferably, the compressed-air supply means comprise a main supply connected to the first channel 54 by means of a pneumatic hose (not shown). The pneumatic hose is spirally wound inside the shaft so as to deform in an orderly fashion during axial movements of the transmission fingers 30.

The interconnected channel sections form a sealed circulation channel that is airtight to compressed air up to 8 bar and, preferably, 5 bar.

By way of example, the pivot connections 50 comprise connections of the shaft-smooth bearing type, or else ball bearings. Preferably, the ball bearings are angular contact ball bearings 62 allowing good transmission of the axial forces.

The pivot connections 50 each include an airtight seal 64. For example, the seal is in one or more parts. Preferably, the seal 64 is in one part taking the form of a ring fitted between the first and the second ring so as to obtain an airtight contact to compressed air up to 8 bar, and to minimize friction. The seal is secured to the second ring 48, thus forming a static seal with the second ring and a dynamic seal with the first ring 46. Seals 64 are mounted coaxially to the angular contact ball bearings 60. Preferably, the rotary joints are mounted axially external to the bearings so as to facilitate their accessibility.

The flange(s) 14 according to the invention comprise braking means 66 for rotationally blocking the second ring 48. The braking means comprise an inflatable seal 68 arranged in the sealed chamber 52. The flange comprises a second compressed-air circulation channel 70, a first section 72 of the second channel, belonging to the first ring 46, being connected at one of its ends to the compressed-air supply means, and at another of its ends to the inflatable seal 68, via the sealed chamber 52. The inflatable seal takes an tonic shape, and is made of an elastomeric material. Preferably, the outer surface of the inflatable seal is adhesive.

The inflatable seal 68 is actuated by the air circulating through the second supply channel 70. The seal during inflation is compressed between the rings and blocks the rotation of the second ring 48 by friction, in the manner of a brake.

The sections 56, 58, 60, 72 of the compressed-air circulation channels 54, 70 are embedded in the rings 46, 48 and the transmission fingers 30. Thus, the rings and the transmission fingers have a small footprint and are easily integrated into the assembly of the drum 10.

The rings and the transmission fingers are made of a rigid material, such as steel, aluminium or resin, and are in one piece. The sections of the compressed-air circulation channels are obtained by drilling.

The manufacturing drum 10 is used in a tyre blank manufacturing method.

A tyre blank of cylindrical shape is manufactured first.

The rotation of the second ring(s) 48 of the manufacturing drum 10 according to the invention is blocked by actuating the braking means 66, the tyre blank is installed on the manufacturing drum 10, then the beads of the tyre blank are held by supplying compressed air to the holding devices 36.

The cylindrical-shaped tyre blank is transformed into a toroidal-shaped tyre blank, during a step called shaping. During this transformation, the crown of the blank is stretched so as to increase its diameter, by pressurizing the volume delimited by the blank and the drum with air, and the beads of the blank are axially brought closer together.

Simultaneously with the axial bringing closer together of the beads of the tyre blank, the rotation of the second ring(s) 48 is freed by not actuating the braking means 66.

The tyre tread is arranged circumferentially on the crown of the tyre blank.

Further variants and embodiments of the invention may be envisaged without departing from the scope of these claims.

The invention claimed is:

1. A drum for manufacturing a tire blank, the drum comprising a shaft extending axially, two flanges movable in axial translation along the shaft, and means for supplying compressed air, each flange comprising at least one pneumatic effector cooperating with the tire blank, and at least one flange comprising a first radially internal ring movable in axial translation along the shaft, and a second radially external ring comprising the at least one pneumatic effector, wherein the second radially external ring is movable in rotation around the first radially internal ring by means of at least two airtight pivot connections, the first radially internal ring, second radially external ring and the pivot connections delimiting at least one sealed chamber, and wherein the at least one flange comprises at least one first compressed-air circulation channel, a first section of the first compressed-air circulation channel belonging to the first radially internal ring being connected at one of its ends to the compressed-air supply means and at the other of its ends to the sealed chamber, and a second section of the first compressed-air circulation channel belonging to the second radially external ring being connected at one of its ends to the sealed chamber and at the other of its ends to the at least one pneumatic effector.

2. The drum according to claim 1, further comprising drive means for the axial translation of the flanges, the drive means comprising transmission fingers, each transmission finger being fixed to a flange and movable in axial translation along a groove of the shaft.

3. The drum according to claim 2, wherein at least one of the transmission fingers is fixed to the first radially internal ring and comprises a third section of the first compressed-air circulation channel connected at one of its ends to the compressed-air supply means and at the other of its ends to the first section of the first compressed-air circulation channel.

4. The drum according to claim 2, wherein the drive means comprise a rod and two nuts, the rod extending axially, being movable in axial rotation, and comprising two threaded sections of opposite pitches, and each nut being movable to slide substantially symmetrically with respect to the other nut along one of the two threaded sections, and each transmission finger being fixed to a nut.

5. The drum according to claim 1, wherein the at least one pneumatic effector comprises a holding device capable of holding a bead of the tire blank and of forming an airtight contact with the bead.

6. The drum according to claim 1, wherein the at least one flange comprises braking means for rotationally blocking the second radially external ring.

7. The drum according to claim 6, wherein the braking means comprise an inflatable seal arranged in the sealed chamber, the at least one flange comprising a second compressed-air circulation channel, and a first section of the second compressed-air circulation channel, belonging to the first radially internal ring, being connected at one of its ends to the compressed-air supply means, and at another of its ends to the inflatable seal.

8. The drum according to claim 1, wherein the sections of the compressed-air circulation channels are embedded in the first radially internal ring, the second radially external ring and the transmission fingers.

9. A method of holding a tire blank, the method comprising the following step:
providing the drum according to claim 5; and
holding beads of the tire blank by supplying compressed air to the holding devices using the compressed-air supply means.

10. A method for manufacturing a tire blank comprising the following steps:
manufactured manufacturing a cylindrical-shaped tire blank using the drum according to claim 5; blocking rotation of the second radially external ring of the drum by actuating braking means; holding beads of the tire blank by supplying compressed air to the holding device using the compressed-air supply means; stretching a crown of the tire blank so as to increase its diameter, by pressurizing a volume delimited by the blank and the drum with air, and axially bringing closer together the beads of the tire blank, using the drum; and simultaneously with the axial bringing closer together of the beads of the tire blank, freeing a rotation of the second radially external ring by not actuating the braking means.

* * * * *